C. EVEN.
LICENSE PLATE.
APPLICATION FILED MAY 18, 1921.
1,410,662.
Patented Mar. 28, 1922.
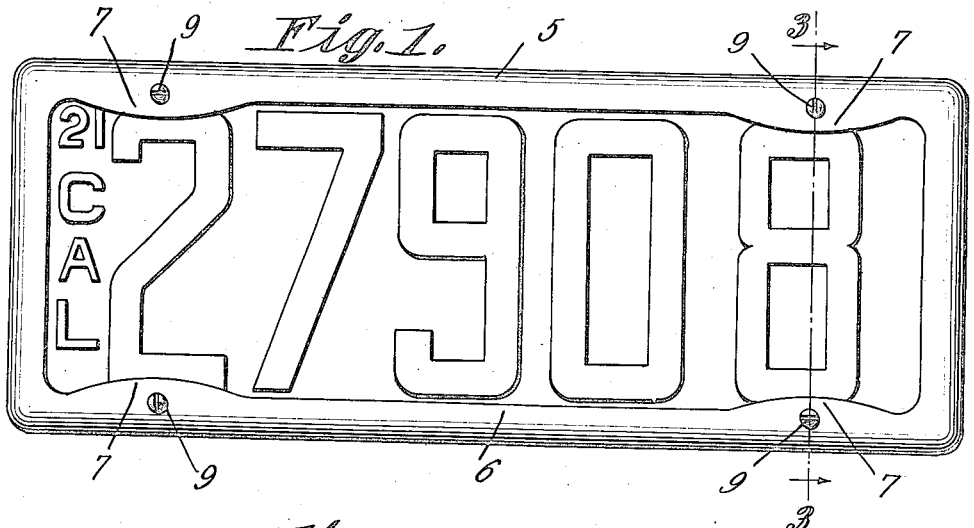
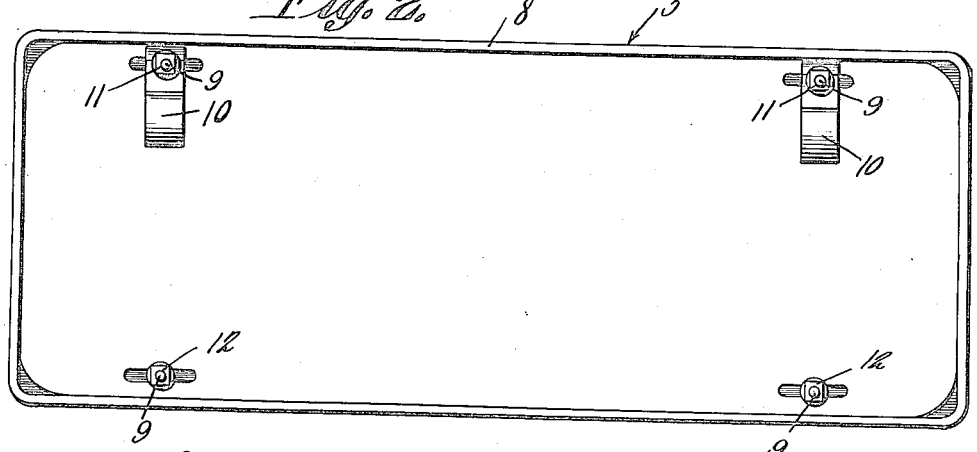
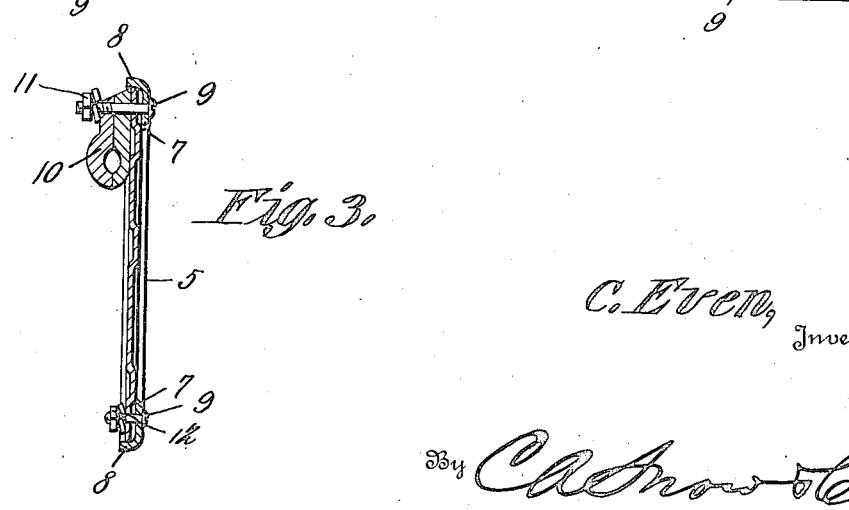
C. Even, Inventor.

UNITED STATES PATENT OFFICE.

CHARLES EVEN, OF LOS ANGELES, CALIFORNIA.

LICENSE PLATE.

1,410,662.  Specification of Letters Patent.  Patented Mar. 28, 1922.

Application filed May 18, 1921. Serial No. 470,595.

*To all whom it may concern:*

Be it known that I, CHARLES EVEN, a citizen of the United States, residing at Los Angeles, in the county of Los Angeles and State of California, have invented a new and useful License Plate, of which the following is a specification.

This invention has reference to supports, and more particularly to a novel form of support employed for securing license plates or tags to motor vehicles or the like.

The primary object of the invention is to provide means to hold the license plate rigid at all times, thereby eliminating rattling of the tag, and at the same time insure against the tag becoming bent or broken.

A further object of the invention is to provide a support having means to grip the plate to eliminate movement of the plate within the support when the same is in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view of a support constructed in accordance with the present invention and showing the same as supporting the license plate.

Figure 2 is a rear elevational view of the same.

Figure 3 is a sectional view taken on line 3—3 of Figure 1.

Referring to the drawing in detail, the device includes a frame 5 formed of any suitable material the same being preferably constructed of aluminum, so that the support will be exceptionally light.

The support is preferably rectangular in formation, but it is to be understood that the shape of the support would be governed solely by the shape of the license plate to be secured thereto.

An inwardly extending flange indicated at 6 is formed on the face of the support, the flange being provided with enlargements 7 disposed adjacent to the respective ends thereof, and as shown, these enlargements contact with the raised letters forming a part of the tag, thereby insuring against the tag or plate rattling within its support.

The frame extends rearwardly as indicated at 8 to provide a flange, which practically houses the edges of the plate supported in the device, and protects the edges of the plate from the weather. In each of the enlargements 7 is an opening to accommodate a securing bolt 9, which bolts pass through the jaws of the separable clamps 10, which clamps are designed to grip the usual brace rod that braces the headlights of a motor vehicle.

A nut 11 is positioned on each of the bolts, and acts as a means for securing the separable clamps to the support, and at the same time secures the plate or tag to the support. At the base of the plate are the bolts 12 which pass through openings formed in the frame, and secure the plate thereto.

Having thus described the invention, what is claimed as new is:—

1. A license plate support comprising a frame having an inwardly extending flange, said flange having enlargements to contact with the numbers of a license plate, clamps having connection with the support, and bolts passing through the enlargements, license plate and clamps for securing the support, license plate and clamps together.

2. A license plate support comprising a rectangular frame, a license plate having embossed numbers thereon, means forming a part of the support, and adapted to contact with the embossed numbers to prevent rattling of the plate within the support, a rearwardly extending flange formed on the support, and a clamping means secured to the rear of the support.

In testimony that I claim the foregoing as my own, I have hereto affixed my signature in the presence of two witnesses.

CHARLIE EVEN.

Witnesses:
 HARRY S. DEHUN,
 C. P. HALLETT.